Feb. 12, 1952        W. C. ELMORE        2,585,639
COMPENSATED ELECTRON DISCHARGE MEASURING DEVICE
Filed Jan. 6, 1949
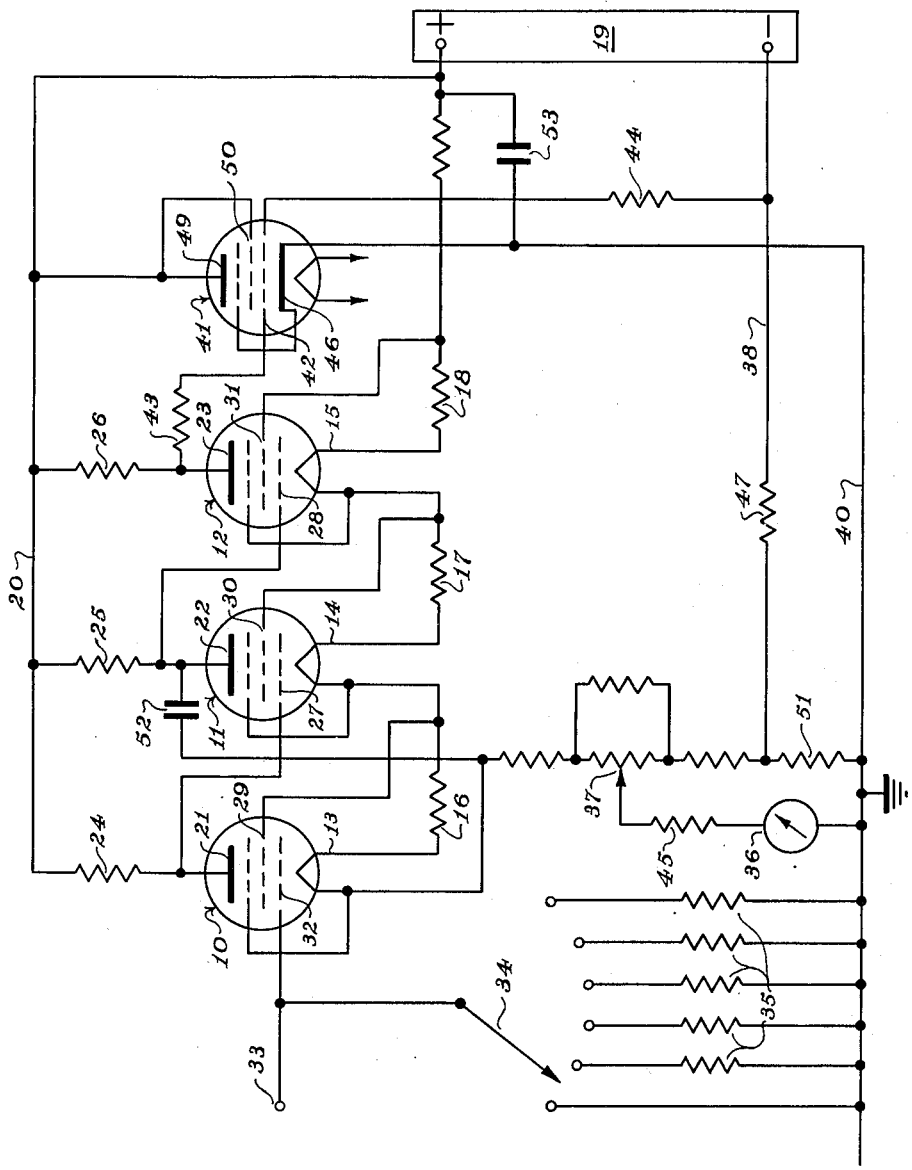
WITNESSES:
Ralph Carlisle Smith
Gene C. Newlin
INVENTOR:
William C. Elmore
BY
Roland A. Anderson
Attorney Patented Feb. 12, 1952

2,585,639

UNITED STATES PATENT OFFICE 2,585,639

COMPENSATED ELECTRON DISCHARGE MEASURING DEVICE

William C. Elmore, Springfield Township, Delaware County, Pa., assignor to the United States of America as represented by the United States Atomic Energy Commission Application January 6, 1949, Serial No. 69,527

3 Claims. (Cl. 171—95)

1

This invention relates to an electronic measuring device and more particularly to a device for measuring minute unidirectional currents.

It is desirable in the measurement of minute unidirectional currents to employ a circuit that is stable, permissive of large tolerance in manufactured parts, and will operate from a single source of direct current potential. To measure minute unidirectional currents it is necessary to employ a direct-coupled amplifier in which the anode of a given stage is connected to the control grid of a succeeding stage either directly or through a biasing battery. Circuits of the type described in "Theory and Application of Electron Tubes," by Reich, published by McGraw-Hill, New York, New York, make use of batteries to furnish the proper potentials to the individual tubes. It is advantageous to operate a circuit of the class described by Reich from a single direct current source and more particularly from a stabilized alternating current rectified source. Alternating current operated direct-coupled amplifier of the type described by Loftin-White in "Proceedings I. R. E.," volume 18, 1930 makes use of a voltage divider in which the absolute potential of tube electrodes increases from an assumed zero potential at the first grid to progressively higher potentials for succeeding stages. Circuits of this type require maintaining the operation of all tubes at the midpoint of their operating or output current curve, or what may be termed stabilizing against "drift" tending to arise from change of constants or conditions. The change in constants or conditions may be due to aging of resistors, temperature co-efficients, effects in resistors, line voltage variations, and manufactured tolerance. The use of the above referenced circuits in an unidirectional current measuring device is not entirely satisfactory because of variations in heater current and the importance of maintaining a constant heater current for the first tube of a direct coupled amplifier is well known. When the filament (or heater) current varies, which it does with line voltage fluctuations, the effective contact difference in potential of the first tube varies, resulting in a drift of the zero position of an associated indicating meter.

This invention eliminates the need for batteries by means of a circuit arrangement which furnishes proper potentials to circuit components from a regulated direct current power source. Furthermore, in order to accurately measure currents of very small values, stability is of great importance, therefore a degeneration circuit is employed. With the tubes connected in a series arrangement any change in filament current is indicated on a meter which can be compensated by a slight adjustment.

An object of this invention is to provide a simple, reliable and efficient measuring device whereby currents of minute values may be accurately measured.

Another object of this invention is to provide proper tube characteristic potentials from a single direct current power supply by means of series resistance connections.

A further object of this invention is to provide proper tube characteristic potential from a single source of direct current potential and therefore eliminate the need for separate batteries.

A further object of this invention is to provide a means for stabilizing a measuring device in that any change in filament current is indicated on a microammeter whereby this change may be compensated for by adjustments in accordance with the indication of the microammeter.

A further object of this invention is to provide a means of degeneration to give greater stability and more reliable measurements of minute currents over a wide range.

Other objects and advantages of the present invention will become apparent to persons skilled in the art from the following description of the presently preferred embodiment taken in connection with the drawings made part of this specification.

The drawing is a schematic diagram of a system constructed in accordance with the principles herein.

Referring now more particularly to the drawing, tubes 10, 11 and 12 are associated in the well known manner to form a direct-coupled amplifier. More particularly, the filaments 13, 14, and 15 of the respective tubes are furnished with the proper potentials by a low-resistance series path including resistors 16, 17 and 18 connected between the several filaments. Anodes 21, 22 and 23 of tubes 10, 11 and 12 respectively are connected to the positive potential conductor 20 through anode resistors 24, 25 and 26 respectively. Anode 21 of tube 10 is connected directly to grid 27 of tube 11 and anode 22 of tube 11 is connected directly to grid 28 of tube 12. The individual screen grids 29, 30 and 31 receive their respective operating potentials by connection to the more positive end of the individual filament series resistors 16, 17 and 18 respectively. The positive potential of conductor 20 and the negative potential of conductor 38 are furnished from a regulated power supply 19. It should be noted here that power supply 19 is the only source of direct-current potential throughout the circuit.

Input terminal 33 is connected directly to the input grid 32 of tube 10. Also connected in the input circuit between grid 32 and ground conductor 40 is employed a multi-position switch 34 and a plurality of resistors 35. With the input connected in this manner the circuit can be made to operate over a wide range of input currents.

For the purpose of indicating the currents impressed on input terminal 33 an indicating meter 36 is employed with associated parts to be explained hereinafter. In order that the indicating meter 36 may be positioned on zero with no input signal, i. e., standardized, a potentiometer 37 is employed to provide a means for selecting a ground potential point between the negative potential of conductor 38 and the filament 13 of tube 10. The indicating meter may be made a direct reading meter by including a calibrated series resistor 45.

Turning now to the operation of the indicating meter 36 and to the degenerative feed-back features of the circuit, tube 41 is employed. More particularly anode 23 of tube 12 is coupled to grid 42 of tube 41 through resistor 43. Grid 42 is connected to the negative conductor 38 through resistor 44. In order that tube 41 is enabled to operate at its proper characteristics in the circuit it is necessary that grid 42 be maintained at a negative potential. Since the circuit does not employ the use of batteries, grid 42 is maintained at a negative potential by a voltage divider. More particularly anode 23 of tube 12 is at approximately 116 volts positive, while conductor 38 is at a negative potential of approximately 65 volts, therefore since grid 42 of tube 41 is connected at the midpoint of a voltage divider including properly proportioned resistors 43 and 44, it is impressed with a few volts negative with respect to the potential on its cathode 46. The cathode 46 is connected directly to ground conductor 40 while anode 49 and screen grid 50 are connected together and to the positive potential conductor 20.

The two electrodes (i. e. the anode 23 of tube 12 and grid 42 of tube 41) must be coupled together for the successful operation of this circuit. To enable this coupling to be made, the resistor 47 is placed in the main series circuit (which includes the filaments) to provide a negative supply potential for proper biasing. It should be noted that this expedient avoids the need for a separate battery in connection with tube 41, but results in a loss in the unfed-back gain of the amplifier. This loss in gain is not serious since the unfed-back gain ordinarily will be somewhat greater than necessary for good stability of the microammeter or indicating device. The voltage gain between the input grid 32 of tube 10 and the point on the potentiometer 37 where the indicating meter 36 is connected is somewhat less than unity. Turning again to tube 41 the current through the tube returns to the power supply 19 through two paths. One path includes resistor 51, and negative conductor 38. The second path includes ground conductor 40, the indicative meter 36, and the potentiometer 37, one side of which is connected to the negative conductor 38.

The operation of the circuit is briefly explained as follows: A positively directed input current I, causes a positive voltage V to be impressed on grid 32 of tube 10 in accordance with the relation $V = R_0 I$ where $R_0$ is equal to a selected one of the resistances in the plurality of resistances 35 that is selected by switch 34. This input voltage V is amplified by tubes 10, 11 and 12 and associated parts which causes a negative voltage to be impressed on grid 42 of tube 41. The current through tube 41 is thereby reduced to a point where the voltage appearing across resistor 51 is sufficient to raise the mean potential of the cathode 13 of tube 10 an amount to almost equal the input voltage V. A current linearly related to the value V will also flow through the indicating meter which serves to indicate the value of the input current. A negatively directed input current results in a similar behavior with all currents and voltages changing in an opposite way as to that hereinbefore described.

For the purpose of preventing spurious interstage coupling, condensers 52 and 53 are provided to eliminate any tendency toward self oscillation of the circuit.

It should be noted that a particular advantage of the present system accrues from the manner in which the circuit components are arranged so as to eliminate the use of separate batteries. It should also be noted that a degenerative feed-back circuit is employed to attain stability and accuracy in the measurement of minute currents.

It will thus be seen that what has been described herein is a measuring device for measuring minute currents, featuring, in addition, a direct coupled amplifier operated from a single source of supply.

Although the invention has been described with reference to certain specific embodiments, other modifications are possible. Therefore the invention is to be restricted only by the appended claims as interpreted in view of the prior art.

What is claimed is:

1. An apparatus for measuring minute unidirectional current comprising in combination a direct coupled amplifier, a current responsive device and a single source of energization potential, said amplifier comprising a plurality of thermionic tubes having filamentary cathodes, said cathodes being serially connected through interposed resistors, the free end of the cathode of the first tube being connected to a unipotential conductor through a network comprising a first fixed resistor, a potentiometer and a second fixed resistor having a tap intermediate its ends, an input signal terminal connected to the grid of the first tube and an input signal terminal connected to the unipotential conductor, the free end of the cathode of the last tube being connected to the positive terminal of the source of energization, and a connection from the second fixed resistor tap to the negative terminal of the source of energization, and means connecting the current responsive device between the unipotential connection and the potentiometer slider, whereby under the condition of no input signal the potentiometer is adjusted so that the current responsive device indicates zero.

2. An apparatus for measuring minute unidirectional currents comprising a direct coupled amplifier having a pair of input terminals and a plurality of thermionic grid controlled tubes having filamentary cathodes and at least one indirectly heated tube, a single source of energization potential and a current responsive device, said filamentary cathodes and a plurality of resistors alternated in a series circuit, means connecting one free end of said series circuit to the positive pole of said source of energization potential, a network comprising a first fixed resistor, a potentiometer and a second fixed resistor connected in series, a connection between the free end of the first resistor and the second free end of said series circuit, and a connection between the free end of the second fixed resistor and a unipotential conductor, means connecting the negative pole of the source of energization potential and the second fixed resistor at a point intermediate its ends, means connecting one of the input terminals to the grid of the filamentary cathode tube at the second free end of said series circuit and the other input terminal to the unipotential conductor, means connecting the cathode of the indirectly heated amplifier tube to said unipotential conductor, and said current responsive device being connected between the unipotential conductor and the potentiometer movable contact, whereby the interelectrode space current of the indirectly heated tube in passing through the second fixed resistor provides degenerative feedback for stabilizing the interelectrode space current of the filamentary cathode tubes to thereby maintain the bias thereon substantially independent of potentials impressed on the input terminals of the direct coupled amplifier.

3. An apparatus for measuring minute unidirectional electrical quantities comprising in combination a direct coupled multi-tube cascade amplifier, a single source of energization current and a current responsive device, said direct coupled amplifier having at least some filamentary cathode tubes in the first stages, a plurality of first resistors, one each of said resistors being connected between one filament free end of adjacent tubes, a second resistance connecting the free end of the filament of the input tube to a unipotential conductor, a connection from said second resistor proximate the unipotential conductor to the negative pole of the energization source, an adjustable connection to said resistance, and connections from said current responsive device to said adjustable connection and the unipotential conductor, a connection from the free end of the filament of the last of the filamentary cathode tubes to the positive pole of the energization source; a last amplifier tube of the indirectly heated type having its cathode connected to the unipotential conductor whereby upon impression of a potential to be measured between the unipotential conductor and the grid of the input tube, the increase in potential in the second resistance due to increased current through the filamentary cathode tubes is opposed by the increased current through the indirectly heated amplifier tube, whereby the energization potentials impressed on said tubes are stabilized.

WILLIAM C. ELMORE.

REFERENCES CITED

The following references are of record in the file of this patent:

UNITED STATES PATENTS

| Number | Name | Date |
| --- | --- | --- |
| 2,190,743 | Vance | Feb. 20, 1940 |
| 2,431,335 | Langmuir | Nov. 25, 1947 |
| 2,462,190 | Hipple | Feb. 22, 1949 |